United States Patent
Bayang et al.

(10) Patent No.: US 7,230,783 B2
(45) Date of Patent: Jun. 12, 2007

(54) MITIGATION OF MR READ HEAD DISTORTION

(75) Inventors: Josephine Faith Bayang, Tucson, AZ (US); Ernest Stewart Gale, Tucson, AZ (US); David Lee Swanson, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 174 days.

(21) Appl. No.: 11/154,123

(22) Filed: Jun. 16, 2005

(65) Prior Publication Data
US 2006/0285237 A1 Dec. 21, 2006

(51) Int. Cl.
*G11B 5/09* (2006.01)
*G11B 5/035* (2006.01)

(52) U.S. Cl. ............................. 360/46; 360/65
(58) Field of Classification Search ............ None
See application file for complete search history.

(56) References Cited

U.S. PATENT DOCUMENTS

| | | | |
|---|---|---|---|
| 5,307,291 A | 4/1994 | Kita et al. | 364/560 |
| 5,508,945 A | 4/1996 | Mizoh et al. | 364/563 |
| 5,540,398 A | 7/1996 | Nishida et al. | 242/334.2 |
| 5,604,652 A | 2/1997 | Nishida et al. | 360/73.14 |
| 5,689,384 A | 11/1997 | Albrecht et al. | 360/77.12 |
| 5,860,610 A | 1/1999 | Nishida et al. | 242/334.2 |
| 6,021,013 A | 2/2000 | Albrecht et al. | 360/53 |
| 6,043,943 A * | 3/2000 | Rezzi et al. | 360/46 |
| 6,282,051 B1 | 8/2001 | Albrecht et al. | 360/75 |
| 6,320,719 B1 | 11/2001 | Albrecht et al. | 360/77.12 |
| 6,462,904 B1 | 10/2002 | Albrecht et al. | 360/122 |
| 6,657,802 B1 | 12/2003 | Ashley et al. | 360/51 |

* cited by examiner

*Primary Examiner*—William Korzuch
*Assistant Examiner*—Daniell L. Negrón
(74) *Attorney, Agent, or Firm*—John H. Holcombe

(57) ABSTRACT

Mitigation of distortion of read signals from magneto-resistive read head(s) are provided in various embodiments of the present invention. In one embodiment, the read signals provided to a read channel having an analog to digital converter and digital equalizer. Digital peak measurement apparatus is configured to sense the output of the digital equalizer, and provide average positive peak values and average negative peak values of the output. Control apparatus is configured to respond to the peak values, to iteratively determine asymmetry of the peak values and estimate the cancellation slope of the asymmetry and cancellation term relationship; from the measured asymmetry and estimated cancellation slope, to iteratively estimate the convergence cancellation term; and to feed back the convergence cancellation term to modify the digital read signals for the input of the digital equalizer to iteratively converge the asymmetry to substantially zero.

25 Claims, 7 Drawing Sheets

| k | α | yp | yn | Ak | mk |
|---|---|----|----|----|----|
| 0 | 0.00000 | 1.00 | -0.78 | 12.2 | |
| 1 | 0.00076 | 0.94 | -0.83 | 6.3 | -16000 |
| 2 | 0.00158 | 0.87 | -0.88 | -0.2 | -7738 |

MITIGATION OF MR READ HEAD DISTORTION

DOCUMENTS INCORPORATED BY REFERENCE

Commonly assigned co-pending U.S. patent application Ser. No. 10/966,531 is incorporated for its showing of look-up modules employed for mitigating signal asymmetry.

FIELD OF THE INVENTION

This invention relates to signal processing for read signals of magneto-resistive read heads, and more particularly for mitigating distortion of read signals of magneto-resistive read heads.

BACKGROUND OF THE INVENTION

In a data storage device that employs magnetic media, such as magnetic tape or magnetic disk media, data that is recorded on the magnetic media in the form of flux reversals, is typically read by means of a magneto-resistive read head, which provides analog read signals. The read signals are typically provided to a read channel having at least one preamp for amplifying the signals, and at least one analog to digital converter to convert analog read signals to digital. The resultant signal is a series of digital samples of the readback waveform. All subsequent processing is performed by digital logic. Typically, the readback waveform is not a perfect representation of the original recorded signal due to the nature of magnetic recording, and at least one digital equalizer is provided to bring the signals into a closer representation of the expected ideal and to thereby reduce misinterpretation of the data represented by the signals.

The nature of a magneto-resistive read head is to introduce some distortion into the readback waveform. The incorporated '531 application provides look-up modules for mitigating signal asymmetry from a readback waveform.

SUMMARY OF THE INVENTION

Apparatus, read channel, a magnetic tape drive, a method for deploying a service and a method, each to mitigate distortion of read signals from at least one magneto-resistive read head, are provided by embodiments of the present invention.

In one embodiment, apparatus is provided configured to mitigate distortion of read signals from at least one magneto-resistive read head, the read signals provided to a read channel having at least one analog to digital converter and at least one digital equalizer having an input and an output, the apparatus comprising: digital peak measurement apparatus configured to sense the output of the digital equalizer, and provide average positive peak values and average negative peak values of the digital equalizer output; and control apparatus configured to respond to the provided average positive peak values and average negative peak values, to iteratively determine asymmetry of said average positive peak values and average negative peak values and estimate the cancellation slope of the asymmetry and a convergence cancellation term relationship; from the asymmetry and estimated cancellation slope, to iteratively estimate the convergence cancellation term; and to feed back the convergence cancellation term to modify the digital read signals from the at least one analog to digital converter for the input of the at least one digital equalizer to iteratively converge the asymmetry to substantially zero.

In further embodiment, the control apparatus is configured to provide an initial convergence cancellation term of substantially zero.

In another embodiment, the digital peak measurement apparatus is configured to provide the average positive peak values and average negative peak values from a continuing read signal of substantially constant frequency.

In still another embodiment, to mitigate distortion of read signals from a plurality of magneto-resistive read heads, the control apparatus is configured to separately respond to the average positive peak values and average negative peak values for read signals of each of the plurality of magneto-resistive read heads.

In a still further embodiment, the asymmetry is determined in accordance with the equation $$A = \frac{Y_p + Y_n}{Y_p - Y_n},$$

the estimated slope is determined in accordance with the equation $$m = \frac{A_k - A_{k-1}}{\alpha_k - \alpha_{k-1}},$$

and the cancellation term is determined in accordance with the equation.

$$\alpha = \alpha_{k-1} - \frac{A_k}{m}.$$

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements.

While this invention is described in terms of the best mode for achieving this invention's objectives, it will be appreciated by those skilled in the art that variations may be accomplished in view of these teachings without deviating from the spirit or scope of the invention.

Figure 1:
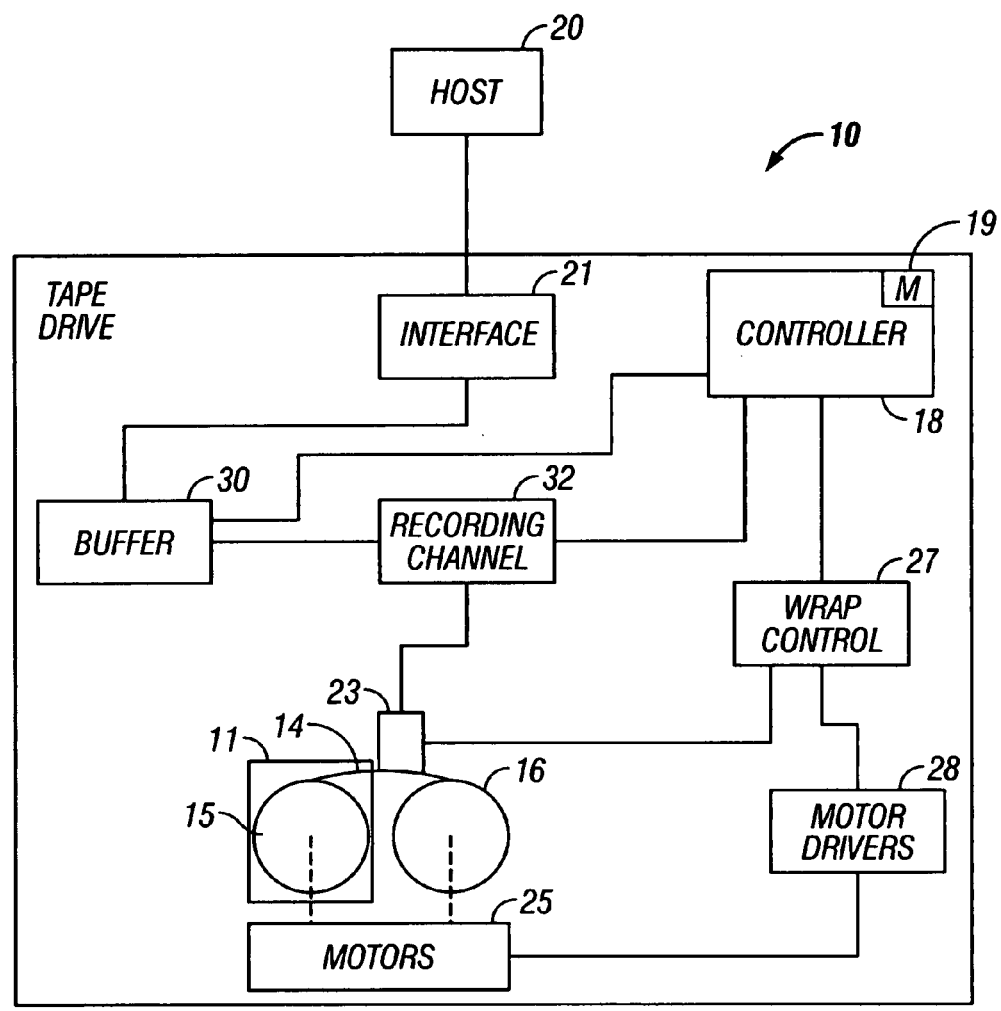
FIG. 1 is a block diagram of an embodiment of a magnetic tape drive which may implement the present invention.

Referring to FIG. 1, a magnetic tape drive 10 is illustrated which may implement aspects of the present invention. The magnetic tape drive provides a means for reading and writing information with respect to a magnetic tape 14 of a magnetic tape cartridge 11.

Magnetic tape cartridges provide a means to store data on magnetic tape to be saved and read at a subsequent time. Further, the magnetic tape cartridges may be interchanged between tape drives, such that a magnetic tape written on one tape drive will be read by another tape drive.

As is understood by those of skill in the art, a magnetic tape cartridge 11 comprises a length of magnetic tape 14 wound on one or two reels 15, 16.

A single reel magnetic tape cartridge 11 is illustrated, examples of which are those adhering to the Linear Tape Open (LTO) format. An example of a magnetic tape drive 10 is the IBM 3580 Ultrium magnetic tape drive based on LTO technology. A further example of a single reel magnetic tape drive and associated cartridge is the IBM 3592 TotalStorage Enterprise magnetic tape drive and associated magnetic tape cartridge. An example of a dual reel cartridge is the IBM 3570 magnetic tape cartridge and associated drive.

Also as is understood by those of skill in the art, a magnetic tape drive 10 comprises one or more controllers 18 of a recording system for operating the magnetic tape drive in accordance with commands received from a host system 20 received at an interface 21. A controller typically comprises logic and/or one or more microprocessors with a memory 19 for storing information and program information for operating the microprocessor(s). The program information may be supplied to the memory via the interface 21, by an input to the controller 18 such as a floppy or optical disk, or by reading from a magnetic tape cartridge, or by any other suitable means. The magnetic tape drive 10 may comprise a standalone unit or comprise a part of a tape library or other subsystem. The magnetic tape drive 10 may be coupled to the host system 20 directly, through a library, or over a network, and employ at interface 21 a Small Computer Systems Interface (SCSI), an optical fiber channel interface, etc.

The magnetic tape cartridge 11 may be inserted in the magnetic tape drive 10, and loaded by the magnetic tape drive so that one or more read and/or write heads 23 of the recording system reads and/or writes information in the form of signals with respect to the magnetic tape 14 as the tape is moved longitudinally by one or more motors 25 which rotate the reels 15, 16. The magnetic tape typically comprises a plurality of parallel tracks, or groups of tracks. In some formats, such as the LTO format, above, the tracks are arranged in a serpentine back and forth pattern of separate wraps, as is known to those of skill in the art. Also as known to those of skill in the art, the recording system may comprise a wrap control system 27 to electronically switch to another set of read and/or write heads, and/or to seek and move the read and/or write heads 23 laterally of the magnetic tape, to position the heads at a desired wrap or wraps, and, in some embodiments, to track follow the desired wrap or wraps. The wrap control system may also control the operation of the motors 25 through motor drivers 28, both in response to instructions by the controller 18.

Controller 18 also provides the data flow and formatter for data to be read from and written to the magnetic tape, employing a buffer 30 and a recording channel 32.

The drive system comprising at least motors 25 and reels 15, 16 moves a magnetic tape 14 with respect to the read head(s) 23 such that the read head(s) may detect magnetic signals on the magnetic tape. A magneto-resistive read head is typically employed to detect the magnetic signals recorded on the magnetic tape, and provides analog read signals. In magnetic tape, a plurality of read heads 23 are typically provided in parallel and typically read a plurality of parallel magnetic tracks from the magnetic tape.

Figure 2:
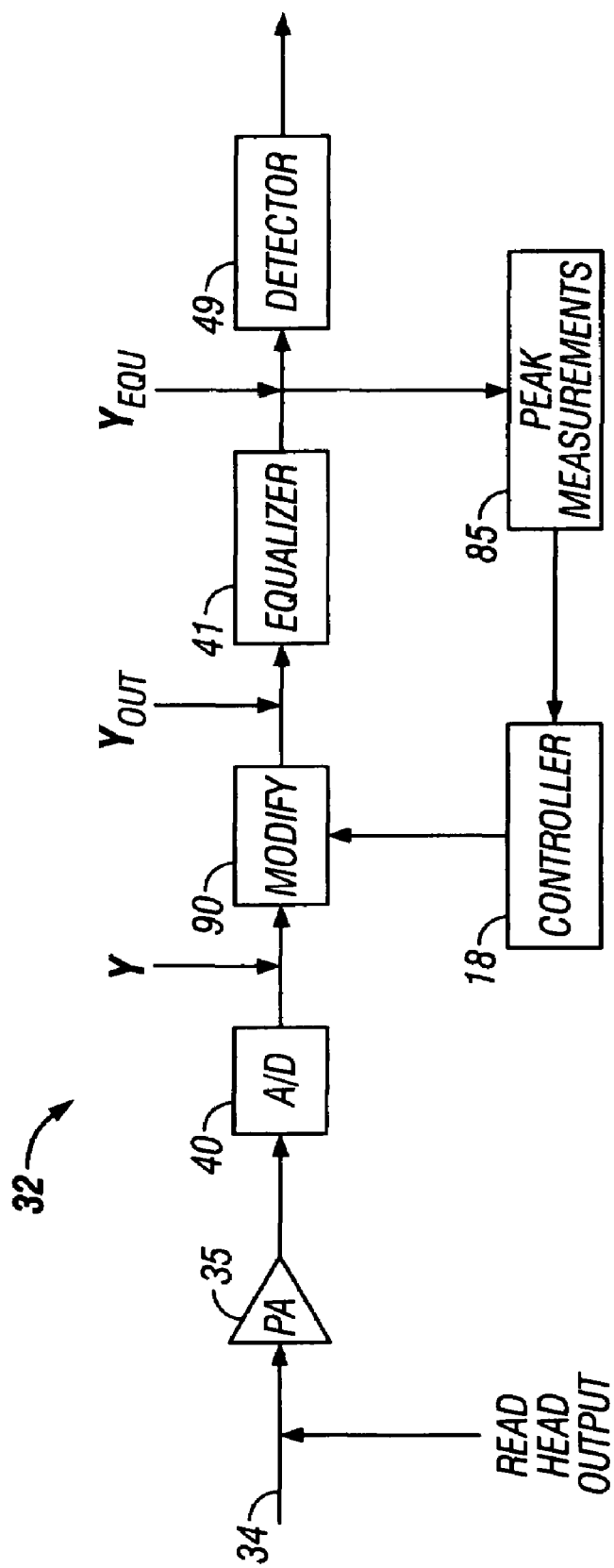
FIG. 2 a block diagram of a read channel in accordance with the present invention.

Referring to FIG. 2, the read signals from the magneto-resistive read head(s) 23 are provided to a read channel 32 in accordance with the present invention. The read channel is illustrated as receiving the output of a single magneto-resistive read head, and will be duplicated for additional read heads. The read head output 34 is supplied to a preamp 35 for amplifying the signals, and an analog to digital converter 40 which digitally samples the magnetic signals detected by the read head, providing digital samples of the magnetic signals. The resultant signal Y is a series of digital samples of the readback waveform. All subsequent processing is performed by digital logic.

A digital equalizer 41 compensates for the change in the signal due to the magnetic recording properties of the write head, the magnetic tape, and the read head, providing an equalized signal Yequ. A data detector 49 is employed to determine the read signal data from the equalized signal.

Quadratic distortion is a common consequence of the magneto-resistive read head and may be described in the form, $Y=X+\alpha X^2$, where Y are digital sample values, the values X are the undistorted samples which are desired, and a is the coefficient of the quadratic term. The magnitude of the a parameter determines the amount of distortion and its sign determines whether it is positive or negative distortion. One measure of distortion is the asymmetry of the readback samples. Asymmetry is a measure of the imbalance of the positive side of the waveform compared to the negative side.

In accordance with the present invention, the distortion is measured at the output Yequ of the digital equalizer 41 of FIG. 2, and the distortion is cancelled by iteratively providing average positive peak values and average negative peak values of the digitally equalized read signals from the digital equalizer 41; and responding to the provided average positive peak values and average negative peak values, iteratively determining asymmetry of the average positive peak values and average negative peak values and estimating the cancellation slope of the asymmetry and a convergence cancellation term relationship; from the asymmetry and estimated cancellation slope, iteratively estimating the convergence cancellation term; and providing feedback of the convergence cancellation term to modify the digital read signals Y which comprise the modified output Yout which are provided to the input of the digital equalizer 41.

Figure 3:
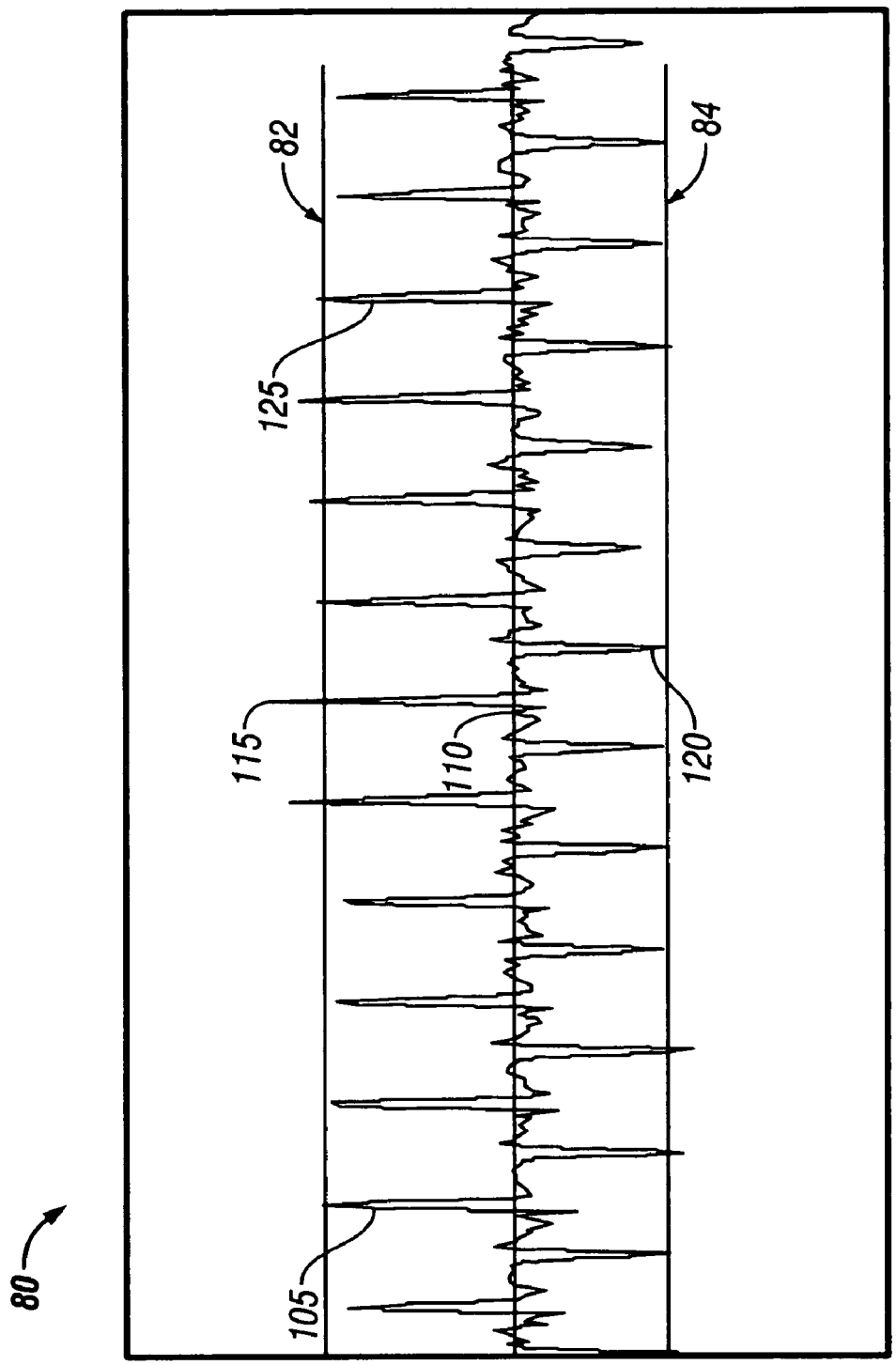
FIG. 3 is an example of an analog read signal of a magneto-resistive read head with signal distortion.

Referring to FIG. 3, the signals 80 are lines drawn between the digital samples of the equalized signal Yequ of FIG. 2. The average positive peak values 82 and average negative peak values 84 of the digitally equalized read signals of FIG. 3 are measured by digital peak measurement apparatus 85 of FIG. 2. Various examples of digital peak detectors and apparatus and methods for selecting the digital peak values to form digital peak measurement apparatus are known to those of skill in the art.

A preferred mode of the present invention is to sample average positive peak values and average negative peak values from a continuing read signal of substantially constant frequency, also called a pattern, such as a data set separator signal from magnetic tape, called "DSS".

Often, the peak amplitudes are a by product of the detection process itself. The asymmetry at the output of the equalizer 41 may not be equivalent to the asymmetry measured at the output of the analog to digital converter 40, but in accordance with the present invention, an asymmetry of zero will correspond to no distortion at either test point. Therefore, driving the asymmetry to zero in accordance with the present invention at the output of the equalizer 41, Yequ of FIG. 2, will drive the asymmetry from the output Yout of the analog to digital converter 40 to zero also.

As discussed above, the distortion is assumed to be of the form $Y=X+\alpha X^2$, and the present invention estimates X by $X \sim Y - \hat{\alpha} Y^2$ where $\hat{\alpha}$ is an estimate of the real $\alpha$ and Y are the digital samples Y at the output of the analog to digital converter. The $\hat{\alpha}$ is estimated to drive the measured asymmetry to zero. In one embodiment, the $\hat{\alpha}$ is determined by the controller 18 from the average positive peak values and average negative peak values. In alternative embodiments, special calculation apparatus may be provided.

Alternatively, the desired signal X may be solved for directly by solving the quadratic equation for each Y, as described in the incorporated '531 application.

Figure 4:
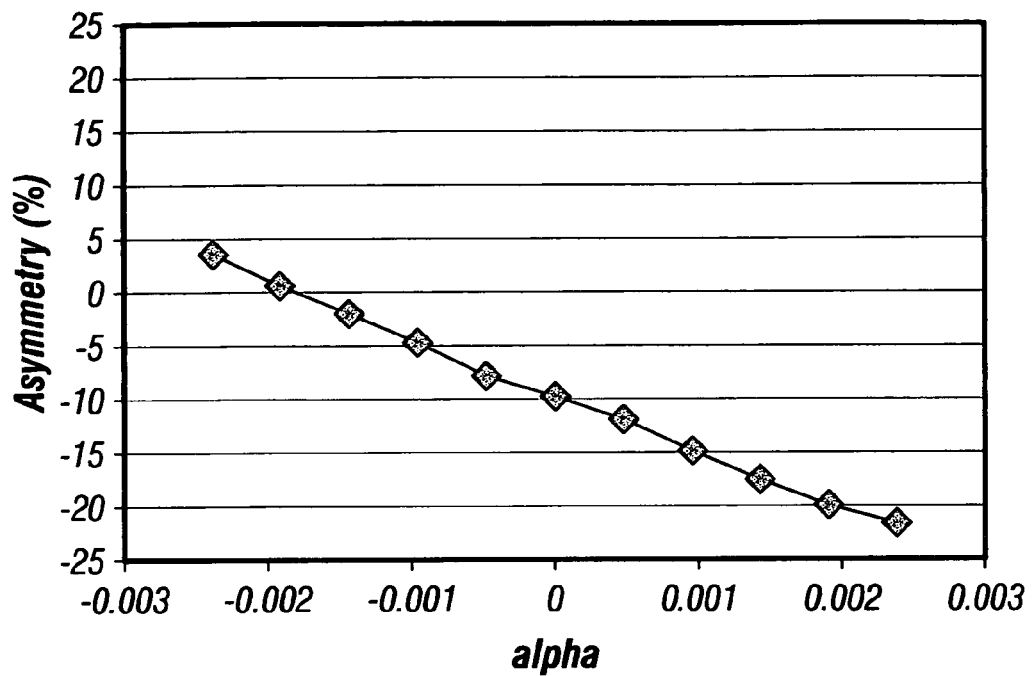
FIG. 4 is an example of the relationship between measured signal distortion at an equalizer output and the cancellation term.

The asymmetry is determined from the imbalance of the positive side of the waveform compared to the negative side, normally specified in percent. As shown in FIG. 4, the relationship between asymmetry and a is monotonic and approximately linear. This relationship holds for various track and asymmetry combinations. Every track will have a varying slope and offset of the line, however, they are all mostly linear. This relationship lends itself to the iterative method of canceling the asymmetry in accordance with the present invention.

Figure 5:
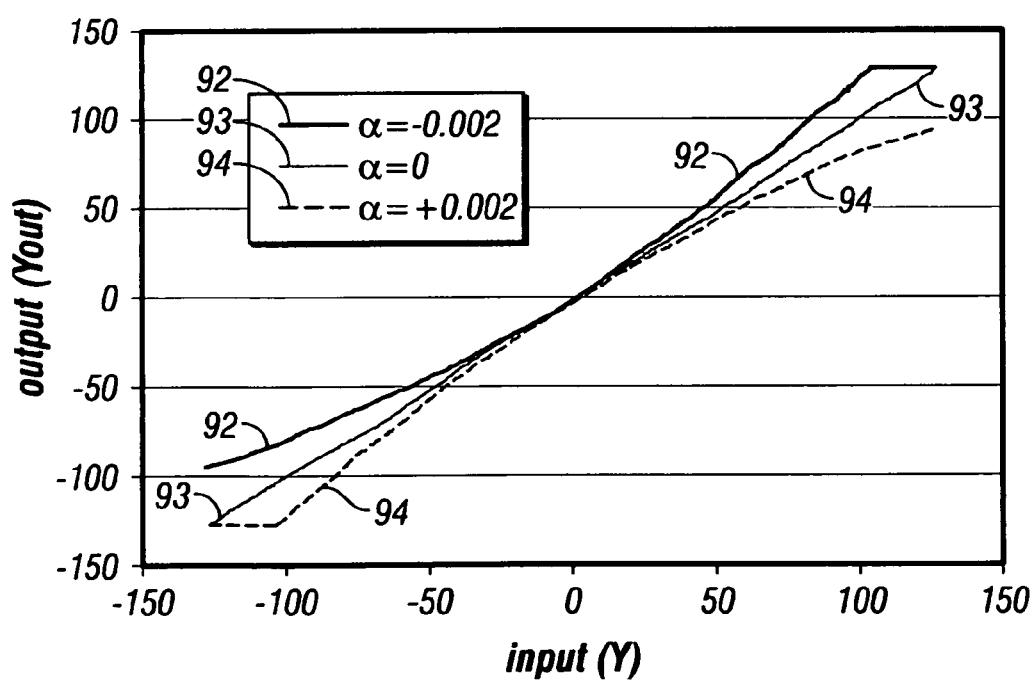
FIG. 5 is a diagrammatic illustration of a transform for a cancellation term of the read channel of FIG. 2.

Referring to FIG. 2, apparatus 90 is provided to modify the digital read signals Y from the analog to digital converter 40 to provide Yout for the input of the digital equalizer 41 in accordance with the provided $\alpha$. The apparatus 90 may comprise the look-up modules of the incorporated '531 Application. As pointed out by the incorporated '531 Application, a look-up module may comprise a look-up table that is filled by computing the desired Yout for each Y input. For example, if the analog to digital converter is an 8 bit digitizer, the input, Y, can range from −128 to +127, integer values only. For any given $\alpha$, the output values are given by Yout = Y − $\alpha Y^2$ for all possible values of Y. Examples of the transformation for three values 92, 93 and 94 of $\alpha$ are provided in FIG. 5. As discussed in the incorporated '531 Application, the digital input signal, for example, signals 105, 110, 115, 120, 125 of FIG. 3, are employed as addresses in the look-up module for the desired a, and the resultant digital output signal is provided at the output of the look-up module. Referring to FIG. 5, the value of $\alpha$ can be positive or negative. Positive values are to correct positive asymmetry, shrinking the positive inputs and stretching the negative inputs. Negative values are to correct negative asymmetry, shrinking the negative side and stretching the positive side. The output values, Yout, are limited to the maximum range of the analog to digital converter. This is the reason for the flat sections on the top of the negative $\alpha$ and the bottom of the positive $\alpha$ curves. The condition of $\alpha=0$ is a special condition where no transformation occurs, what goes in is passed through without modification.

Figure 6:
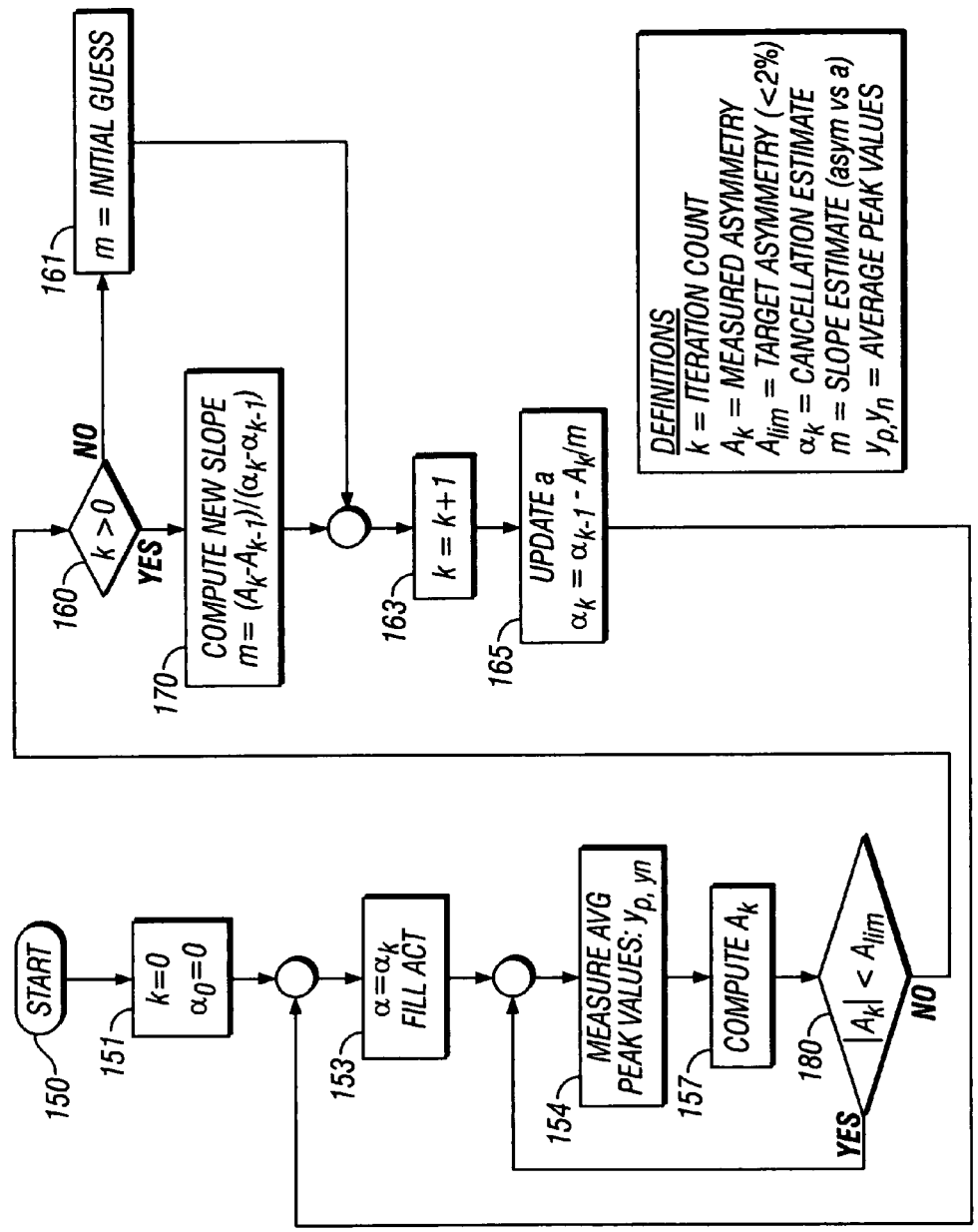
FIG. 6 is a flow chart depicting an embodiment of methods in accordance with the present invention.

In accordance with the present invention, the asymmetry is driven towards zero with a point-slope iterative method. Referring to FIG. 6, beginning at step 150, at the first iteration 151, k=0, the control apparatus is configured to provide an initial convergence cancellation term a of zero, and in step 153, the cancellation table is placed in the state where no transformation occurs of $\alpha=0$. In step 154, the values of the average positive peaks and of the average negative peaks of the output Yequ of the digital equalizer 41 of FIG. 2 are measured by the peak measurement 85. The peak measurement may be conducted in hardware in one embodiment, and, alternatively, may be provided by the controller 18 based on analyses of sample waveforms.

In step 157 of FIG. 6, the asymmetry A is computed, and may be provided in the form of a percentage. If this is the initial pass, k=0, per step 160, an initial guess 161 is made regarding the likely slope, m.

In step 163, the process moves to the first iteration, k=k+1, and updates $\alpha$ in step 165 based on the initial asymmetry $A_0$ and the guessed slope m, in accordance with the equation $$\alpha = \alpha_{(k-1)} - \frac{A_k}{m}.$$

The equation for the cancellation estimate $\alpha$ is derived from the equation $$\alpha_k = \alpha_{(k-1)} + \frac{0 - A_k}{m},$$

in which the target asymmetry is zero. The equation can be solved to provide the next iteration $$\alpha = \alpha_{(k-1)} - \frac{A_k}{m},$$

where $\alpha$ is the estimated convergence cancellation term which is fed back to modify, through the look-up table 90, the digital read signals Y from the analog to digital converter 40 for the input of the digital equalizer 41 of FIG. 2 to iteratively converge the asymmetry to substantially zero.

The steps 153, et seq., of FIG. 6 are repeated based on the feedback of the cancellation term and cancellation table is filled, in step 153, with the transform data of the new iterative $\alpha$, and the next average peak values of the output of the digital equalizer resulting from the new iterative $\alpha$ are measured in step 154, and the new asymmetry $A_k$ is computed.

Then, since the iterative asymmetry is no longer for $k_0$, per step 160, an estimated cancellation slope is computed in step 170 using the preceding and present $\alpha$ and the preceding and present asymmetry A, in accordance with the equation $$m = \frac{A_k - A_{(k-1)}}{\alpha_k - \alpha_{(k-1)}}.$$

A further iteration may then be conducted, employing a new $\alpha$ derived from the equation $$\alpha = \alpha_{(k-1)} - \frac{A_k}{m}.$$

The iterations may continue until convergence of the output of the digital equalizer is reached, per step 180, such as a desired minimum $A_{lim}$, for example within 2 percent, at which level the distortion is considered converged.

At this point, the recording channel may continue to monitor the distortion at the output of the digital equalizer, and if it exceeds the minimum limit $A_{lim}$, in step 180, $\alpha$ is again determined in steps 160 et seq.

Figure 7A:
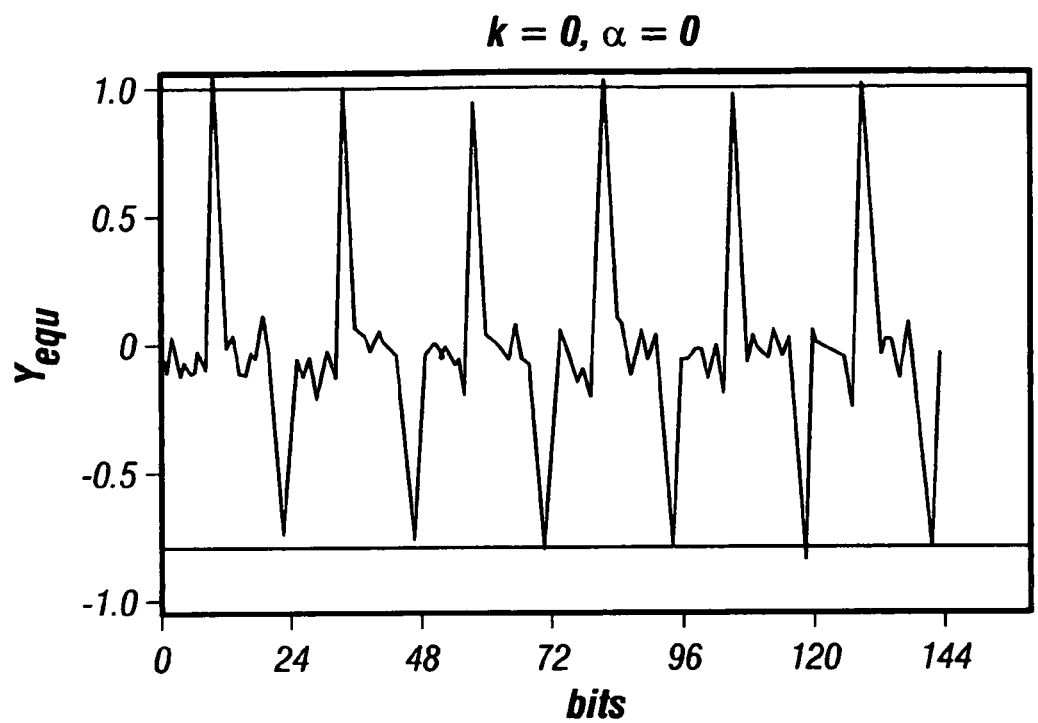
FIGS. 7A, 7B, 7C and 7D are examples of signal distortion and iterative steps in cancellation thereof.
Figure 7B:
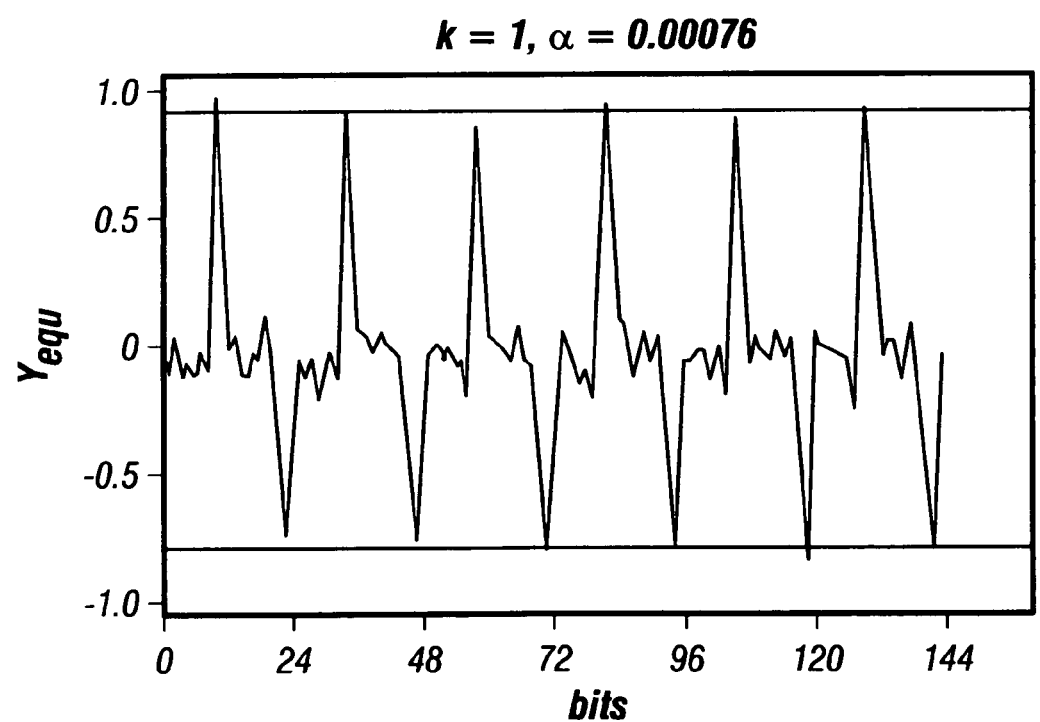
Figures 7C, 7D:
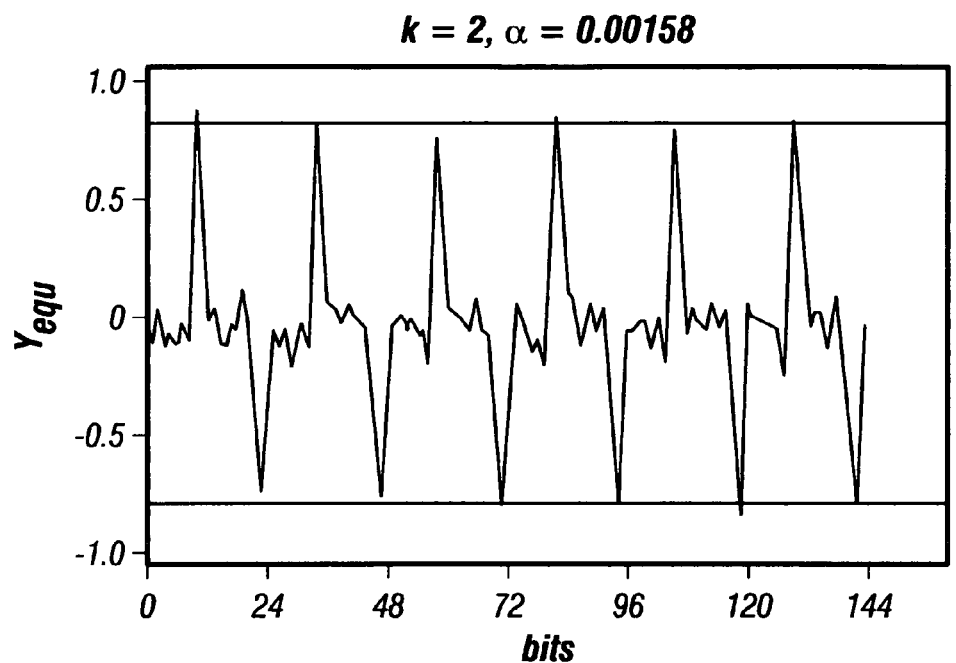

FIGS. 7A, 7B and 7C illustrate an example of the iterative process and FIG. 7D provides examples of specific values of the iterative process. The initial iteration $k_0$ at $\alpha=0$, provides a native asymmetry $A_0$ of the output of the digital equalizer of 12.2% in FIG. 7A. An initial slope guess of m=−16000 is employed for iteration $k_1$. Using the equation $$\alpha_1 = \alpha_0 - \frac{A_0}{m},$$

becomes $$\alpha_1 = 0 - \frac{12.2}{-16000},$$

and provides the value of $\alpha_1=0.00076$. This guess is applied to modify the input to the digital equalizer and, in FIG. 7B, the asymmetry at the output of the digital equalizer is determined to be 6.3%. Now, with two points, the slope estimate can be made and the next $\alpha$ computed. The slope estimate is calculated $$m = \frac{A_1 - A_0}{\alpha_1 - \alpha_0},$$

as $$m = \frac{6.3 - 12.2}{0.00076 - 0},$$

for a value of m=−7738. This value is employed to estimate a new $\alpha$ in which, using the equation $$\alpha_2 = \alpha_1 - \frac{A_1}{m},$$

becomes $$\alpha_1 = 0000763 - \frac{6.3}{-7738},$$

and provides the value of $\alpha_2=0.00158$. As illustrated by FIG. 7C, the resulting measurement of asymmetry at the output of the digital equalizer becomes −0.2%. This is within the allowed convergence band, so the iteration is halted.

The illustrated embodiments of the present invention provide a recording channel of FIG. 2 with one analog to digital converter 40, one modification apparatus 90, one equalizer 41, and one peak measurement apparatus 85 for a single magneto-resistive read head. This implementation may be employed for a magneto-resistive read head of a magnetic disk drive.

The same implementation may be employed for one track of a magnetic tape drive, and would be duplicated for each additional track of the magnetic tape drive. Alternatively, referring to FIG. 1, a plurality of magneto-resistive read heads may be provided to read data in parallel from a plurality of tracks, and one or more of the components 35, 40, 90, 41, 85 may be shared between the magneto-resistive read heads of the magnetic tape drive, and operated sequentially among the various read heads to sense the DSS signals at each of the separate tracks. For either configuration, the control apparatus 18 is, in one embodiment, configured to separately respond to the average positive peak values and average negative peak values for read signals of each of the plurality of magneto-resistive read heads, and provide the convergence separately for each of the magneto-resistive read heads.

The service of mitigating distortion of read signals may be accomplished by providing apparatus in magnetic tape drives or magnetic disk drives, or by adding to a preexisting magnetic tape drive or magnetic disk drive, peak measurement apparatus 85 and modification apparatus 90 of FIG. 2 and supplying program code to the memory 19 for operating the controller 18 of FIG. 1, for example by a service technician.

Those of skill in the art will understand that changes may be made with respect to the specific components of the read channel. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. Apparatus to mitigate distortion of read signals from at least one magneto-resistive read head, said read signals provided to a read channel having at least one analog to digital converter to convert analog read signals to digital and at least one digital equalizer having an input and an output, said apparatus comprising:

digital peak measurement apparatus configured to sense said output of said at least one digital equalizer, and provide average positive peak values and average negative peak values of said digital equalizer output; and control apparatus configured to respond to said provided average positive peak values and average negative peak values, to iteratively determine asymmetry of said average positive peak values and average negative peak values and estimate a cancellation slope of said asymmetry and a convergence cancellation term relationship; from said asymmetry and estimated cancellation slope, to iteratively estimate said convergence cancellation term; and to feedback said convergence cancellation term to modify said digital read signals from said at least one analog to digital converter for said input of said at least one digital equalizer.

2. The apparatus of claim 1, wherein said control apparatus is configured to provide an initial convergence cancellation term of substantially zero.

3. The apparatus of claim 2, wherein said digital peak measurement apparatus is configured to provide said average positive peak values and average negative peak values from a continuing read signal of substantially constant frequency.

4. The apparatus of claim 3, to mitigate distortion of read signals from a plurality of magneto-resistive read heads, wherein said control apparatus is configured to separately respond to said average positive peak values and average negative peak values for read signals of each of said plurality of magneto-resistive read heads.

5. The apparatus of claim 2, wherein said asymmetry is determined in accordance with the equation $$A = \frac{Y_p + Y_n}{Y_p - Y_n},$$

wherein said estimated cancellation slope is determined in accordance with the equation $$m = \frac{A_k - A_{(k-1)}}{\alpha_k - \alpha_{(k-1)}},$$

and said cancellation term is determined in accordance with the equation $$\alpha = \alpha_{(k-1)} - \frac{A_k}{m}.$$

6. Read channel configured to receive read signals of at least one magneto-resistive read head, said read channel comprising:
　at least one analog to digital converter to convert analog read signals to digital;
　at least one digital equalizer having an input and an output;
　digital peak measurement apparatus configured to sense said output of said at least one digital equalizer, and provide average positive peak values and average negative peak values of said digital equalizer output; and
　control apparatus configured to respond to said provided average positive peak values and average negative peak values, to iteratively determine asymmetry of said average positive peak values and average negative peak values and estimate a cancellation slope of said asymmetry and a convergence cancellation term relationship; from said asymmetry and estimated cancellation slope, to iteratively estimate said convergence cancellation term; and to feedback said convergence cancellation term to modify said digital read signals from said at least one analog to digital converter for said input of said at least one digital equalizer.

7. The read channel of claim 6, wherein said control apparatus is configured to provide an initial convergence cancellation term of substantially zero.

8. The read channel of claim 7, wherein said digital peak measurement apparatus is configured to provide said average positive peak values and average negative peak values from a continuing read signal of substantially constant frequency.

9. The read channel of claim 8, configured to receive read signals from a plurality of magneto-resistive read heads, wherein said control apparatus is configured to separately respond to said average positive peak values and average negative peak values for read signals of each of said plurality of magneto-resistive read heads.

10. The read channel of claim 7, wherein said asymmetry is determined in accordance with the equation $$A = \frac{Y_p + Y_n}{Y_p - Y_n},$$

wherein said estimated cancellation slope is determined in accordance with the equation $$m = \frac{A_k - A_{(k-1)}}{\alpha_k - \alpha_{(k-1)}},$$

and said cancellation term is determined in accordance with the equation $$\alpha = \alpha_{(k-1)} - \frac{A_k}{m}.$$

11. A magnetic tape drive comprising:
　at least one magneto-resistive read head configured to provide read signals derived from signals on a magnetic tape moved past said at least one magneto-resistive read head;
　a magnetic tape drive system configured to move a magnetic tape past said at least one magneto-resistive read head;
　at least one analog to digital converter to convert analog read signals to digital;
　at least one digital equalizer having an input and an output;
　digital peak measurement apparatus configured to sense said output of said at least one digital equalizer, and provide average positive peak values and average negative peak values of said digital equalizer output; and
　control apparatus configured to respond to said provided average positive peak values and average negative peak values, to iteratively determine asymmetry of said average positive peak values and average negative peak values and estimate a cancellation slope of said asymmetry and a convergence cancellation term relationship; from said asymmetry and estimated cancellation slope, to iteratively estimate said convergence cancellation term; and to feedback said convergence cancellation term to modify said digital read signals from said at least one analog to digital converter for said input of said at least one digital equalizer.

12. The magnetic tape drive of claim 11, wherein said control apparatus is configured to provide an initial convergence cancellation term of substantially zero.

13. The magnetic tape drive of claim 12, wherein said digital peak measurement apparatus is configured to provide said average positive peak values and average negative peak values from a continuing read signal of substantially constant frequency.

14. The magnetic tape drive of claim 13, comprising a plurality of magneto-resistive read heads, and wherein said control apparatus is configured to separately respond to said average positive peak values and average negative peak values for read signals from each of said plurality of magneto-resistive read heads.

15. The magnetic tape drive of claim 12, wherein said asymmetry is determined in accordance with the equation $$A = \frac{Y_p + Y_n}{Y_p - Y_n},$$

wherein said estimated cancellation slope is determined in accordance with the equation $$m = \frac{A_k - A_{(k-1)}}{\alpha_k - \alpha_{(k-1)}},$$

and said cancellation term is determined in accordance with the equation $$\alpha = \alpha_{(k-1)} - \frac{A_k}{m}.$$

16. Method for mitigating distortion of read signals from at least one magneto-resistive read head, said read signals converted from analog read signals to digital read signals, and said digital read signals digitally equalized, said method comprising:
   iteratively providing average positive peak values and average negative peak values of said digitally equalized read signals; and
   responding to said provided average positive peak values and average negative peak values, iteratively determining asymmetry of said average positive peak values and average negative peak values and estimating a cancellation slope of said asymmetry and a convergence cancellation term relationship;
   from said asymmetry and estimated cancellation slope, iteratively estimating said convergence cancellation term; and
   providing feedback of said convergence cancellation term to modify said digital read signals for said digitally equalizing step.

17. The method of claim 16, wherein an initial convergence cancellation term is substantially zero.

18. The method of claim 17, wherein said average positive peak values and average negative peak values are provided from a continuing read signal of substantially constant frequency.

19. The method of claim 18, to mitigate distortion of read signals from a plurality of magneto-resistive read heads, wherein said steps of responding to said provided average positive peak values and average negative peak values, iteratively determining asymmetry of said average positive peak values and average negative peak values and estimating said cancellation slope, iteratively estimating said convergence cancellation term; and providing feedback of said convergence cancellation term, comprises separately conducting said steps for read signals of each of said plurality of magneto-resistive read heads.

20. The method of claim 17, wherein said estimated asymmetry is determined in accordance with the equation $$A = \frac{Y_p + Y_n}{Y_p - Y_n},$$

wherein said estimated cancellation slope is determined in accordance with the equation $$m = \frac{A_k - A_{(k-1)}}{\alpha_k - \alpha_{(k-1)}},$$

and said cancellation term is determined in accordance with the equation $$\alpha = \alpha_{(k-1)} - \frac{A_k}{m}.$$

21. Method for deploying a service of mitigating distortion of read signals from at least one magneto-resistive read head, said read signals converted from analog read signals to digital read signals, and said digital read signals digitally equalized, said method comprising:
   deploying the function of providing average positive peak values and average negative peak values of said digitally equalized read signals;
   deploying the function of responding to said provided average positive peak values and average negative peak values, iteratively determining asymmetry of said average positive peak values and average negative peak values and estimating a cancellation slope of said asymmetry and a convergence cancellation term relationship;
   deploying the function of, from said asymmetry and estimated cancellation slope, iteratively estimating said convergence cancellation term; and
   deploying the function of providing feedback of said convergence cancellation term to modify said digital read signals for said digitally equalizing step.

22. The method of claim 21, wherein an initial convergence cancellation term is substantially zero.

23. The method of claim 22, wherein said step of deploying the function of providing average positive peak values and average negative peak values comprises providing said average positive peak values and average negative peak values from a continuing read signal of substantially constant frequency.

24. The method of claim 23, deploying said service to mitigate distortion of read signals from a plurality of magneto-resistive read heads, wherein said steps of deploying said functions of responding to said provided average positive peak values and average negative peak values, iteratively determining asymmetry of said average positive peak values and average negative peak values and estimated said cancellation slope, iteratively estimating said convergence cancellation term; and providing feedback of said convergence cancellation term, comprises deploying functions of separately conducting said steps for read signals of each of said plurality of magneto-resistive read heads.

25. The method of claim 22, wherein said estimated asymmetry is determined in accordance with the equation $$A = \frac{Y_p + Y_n}{Y_p - Y_n},$$

wherein said estimated cancellation slope is determined in accordance with the equation $$m = \frac{A_k - A_{(k-1)}}{\alpha_k - \alpha_{(k-1)}},$$

and said cancellation term is determined in accordance with the equation $$\alpha = \alpha_{(k-1)} - \frac{A_k}{m}.$$

* * * * *